(No Model.)

R. OLIVER.
EAR RING SHIELD.

No. 249,201.  Patented Nov. 8, 1881.

Witnesses:
Geo. H. Miatt
Wm A. Pollock

Inventor:
Richard Oliver,
By his Attorney
E N Dickerson

UNITED STATES PATENT OFFICE.

RICHARD OLIVER, OF BROOKLYN, NEW YORK.

EAR-RING SHIELD.

SPECIFICATION forming part of Letters Patent No. 249,201, dated November 8, 1881.

Application filed August 19, 1881. (No model.)

*To all whom it may concern:*

Be it known that I, RICHARD OLIVER, of the city of Brooklyn and State of New York, have invented a new and useful Improvement in Ear-Ring Shields, of which the following is a full, clear, and exact description, reference being had to the accompanying drawings.

My invention relates to what is known as an "ear-ring shield," the design of which is to protect a valuable jewel from observation by covering it with a spherical or similar shield while worn in public. These shields have been heretofore made of hollow spheres formed of metal or of enameled metal, and they have been usually arranged in two independent halves, which have been pressed together and held by friction. The most desirable color of these shields is black, and they have been usually made by placing a black enamel upon the metal of the shield.

I have discovered that a thin shield of rubber or celluloid can be applied to the outside of a metal case with the same effect and with much less expense than if the shields were made of enameled metal; also, owing to the fact that two independent halves of a shield very readily separate, on account of loosening at the joint, I have devised a method of closing the two halves by a locking-spring.

My invention will be clearly understood from the accompanying drawings, of which—

Figure 1:
Figure 2:
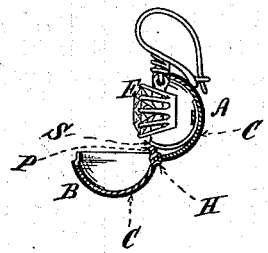

Figure 1 shows a cross-section of my invention with the jewel inclosed, and the two halves of the shield closed around the jewel. Fig. 2 represents a similar section with the shield open.

A and B represent the two halves of the shield hinged together at H. The shields themselves are made of metal and covered with a coating, C, of india-rubber or celluloid, or equivalent material, independently made and applied. A tooth, P, is attached to the part B, bearing against a spring, S, so that said spring will tend to hold the shield closed when it has been closed and open when it has been opened.

E represents the inclosed ear-ring.

It is plain that the locking contrivance would be applicable to an ear-ring whether formed of metal and rubber or not, and also that different forms of spring might be used—as, for instance, a spiral spring—and that by the use of a proper spring the hinged joint might be dispensed with.

By my improvement the loss of the shields is prevented, as the spring keeps them continually closed around the jewel, and a cheap and attractive article is made by reason of the fact of the surface being covered with hard rubber.

What I claim as my invention, and desire to secure by Letters Patent, is—

1. An improved composite jewel-shield, which consists of a metallic backing having a surface made independently and applied thereto, of hard rubber or celluloid, substantially as described.

2. A jewel-shield consisting of two independent hemispherical sections adapted to embrace and surround the jewel and to be closed by a spring, substantially as described.

3. A jewel-shield composed of two independent hinged sections adapted to be locked both in their open and closed positions by the action of a spring, substantially as described.

RICHD. OLIVER.

Witnesses:
 WM. POLLOCK,
 GEO. W. MIATT.